United States Patent
Gill (10) Patent No.: US 6,697,236 B2
(45) Date of Patent: Feb. 24, 2004

(54) SYSTEM AND METHOD FOR AN EXCHANGE STABILIZED AP-COUPLED FREE LAYER FOR MR HEADS

(75) Inventor: Hardayal Singh Gill, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 87 days.

(21) Appl. No.: 10/106,765

(22) Filed: Mar. 25, 2002

(65) Prior Publication Data

US 2003/0179518 A1 Sep. 25, 2003

(51) Int. Cl.$^7$ .............................................. G11B 5/127
(52) U.S. Cl. .................................................. 360/324.12
(58) Field of Search ................. 360/324.11, 324.12, 360/324.1, 313, 319, 121, 125, 126, 119; 324/252

(56) References Cited

U.S. PATENT DOCUMENTS

| | | | |
|---|---|---|---|
| 5,408,377 A | 4/1995 | Gurney et al. | |
| 5,436,778 A | 7/1995 | Lin et al. | |
| 5,583,725 A | * 12/1996 | Coffey et al. | |
| 5,648,885 A | 7/1997 | Nishioka et al. | |
| 5,920,446 A | 7/1999 | Gill | |
| 6,134,090 A | 10/2000 | Mao et al. | 360/324.1 |
| 6,181,534 B1 | 1/2001 | Gill | 360/324.1 |
| 6,201,673 B1 | * 3/2001 | Rottmayer et al. | 360/324.12 |
| 6,219,208 B1 | 4/2001 | Gill | 360/324.1 |

FOREIGN PATENT DOCUMENTS

| | | |
|---|---|---|
| DE | 196 52 536 | 6/1997 |
| JP | 2000-20922 | 1/2000 |

OTHER PUBLICATIONS

Y. Tsuchiya et al., "RuRhMn and PtMn Specular Spin–Valve with Magnetic Oxide Layer" IEEE Transactions on Magnetics vol. 36. No. 5 Sep. 2000.
H. Sakakima et al., "Enhanced GMR in PtMn–Based Spin Valves with Specular Reflective Thin Oxide Layers" IEEE Transactions on Magnetics vol. 36 No. 5 Sep. 2000.
H. Sakakima et al. "Enhancement of MR ratios using thin oxide layers in PtMn and $-Fe_2O_3$–based spin valves" Journal of Magnetic Materials 210 (2000).
M Saito et al. "PtMn valve with synthetic ferrimagnet free and pinned layers" Journal of Applied Physics vol. 87 No. 9 May 1, 2000.

* cited by examiner

Primary Examiner—Allen Cao
(74) Attorney, Agent, or Firm—Silicon Valley IP Group, PC; Dominic M. Kotab (57) ABSTRACT

A magnetoresistive read (MR) sensor system and a method for fabricating the same are provided. First provided are a spacer layer, and a first ferromagnetic layer positioned above the spacer layer. Also included is an antiparallel layer positioned above the first ferromagnetic layer. A second ferromagnetic layer is positioned above the antiparallel layer. Such first and second ferromagnetic layers are antiferromagnetically coupled. Next provided is a pair of antiferromagnetic layers positioned above the second ferromagnetic layer for defining inner free portions and outer pinned portions of the first ferromagnetic layer and the second ferromagnetic layer. The inner free portion of the first ferromagnetic layer has a first thickness $t_A$, the inner free portion of the second ferromagnetic layer has a second thickness $t_B$, the outer pinned portion of the first ferromagnetic layer has a third thickness $t_C$, and the outer pinned portion of the second ferromagnetic layer has a fourth thickness $t_D$. The third thickness $t_C$ of the first ferromagnetic layer and the fourth thickness $t_D$ of the second ferromagnetic layer are substantially equal to the enhance the pinning of the outer pinned portions of the ferromagnetic layers.

18 Claims, 6 Drawing Sheets

$$\frac{\Delta R}{R} \approx 3-4\%$$

SYSTEM AND METHOD FOR AN EXCHANGE STABILIZED AP-COUPLED FREE LAYER FOR MR HEADS

FIELD OF THE INVENTION

The present invention relates to magnetoresistive read (MR) sensors for reading signals recorded in a magnetic medium, and more particularly, this invention relates to improving a free layer of MR sensors for improving operating characteristics.

BACKGROUND OF THE INVENTION

Computer systems generally utilize auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive read sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization of the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using only two layers of ferromagnetic material separated by a layer of non-magnetic electrically conductive material are generally referred to as spin valve (SV) sensors manifesting the GMR effect (SV effect). In a spin valve sensor, one of the ferromagnetic layers, referred to as the pinned layer, has its magnetization typically pinned by exchange coupling with an antiferromagnetic (e.g., NiO, FeMn, PtMn) layer. The magnetization of the other ferromagnetic layer, referred to as the free layer, however, is not fixed and is free to rotate in response to the field from the recorded magnetic medium (the signal field). In spin valve sensors, the spin valve effect varies as the cosine of the angle between the magnetization of the pinned layer and the magnetization of the free layer. Recorded data can be read from a magnetic medium because the external magnetic field from the recorded magnetic medium causes a change in the direction of magnetization in the free layer, which in turn causes a change in resistance of the spin valve sensor and a corresponding change in the sensed current or voltage.

Figure 1:
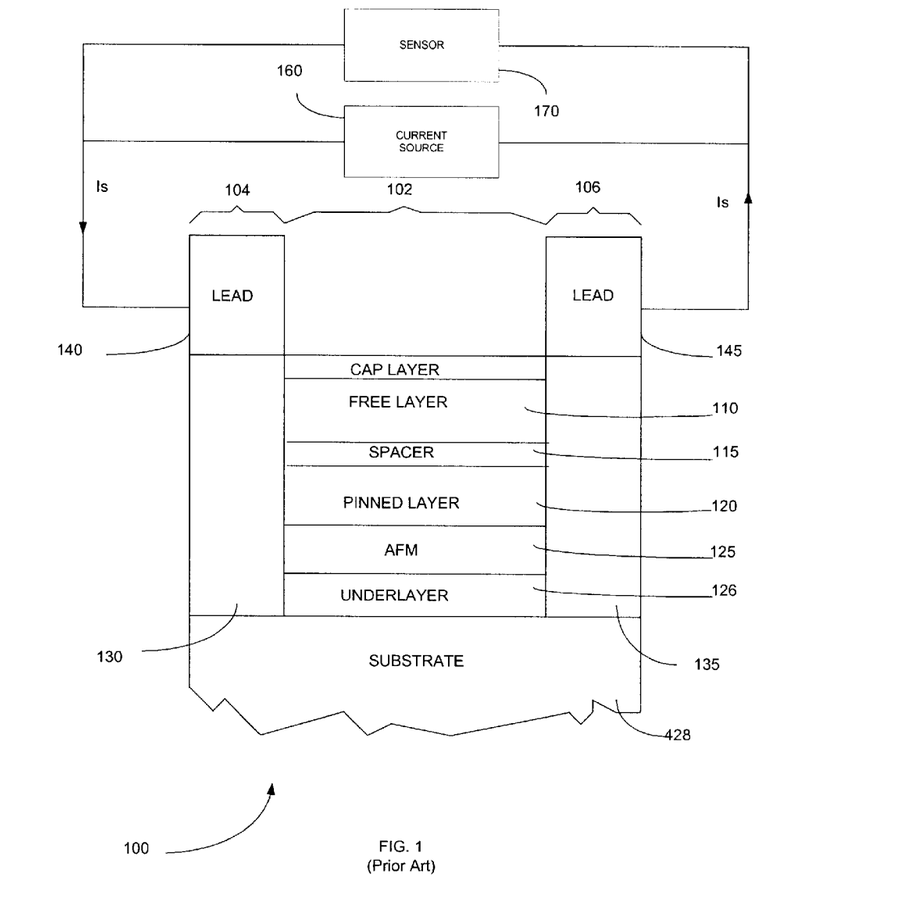
FIG. 1 is a schematic diagram of an air bearing surface (ABS), not to scale, of a prior art magnetoresistive read (MR) sensor.

FIG. 1 shows a typical spin valve sensor 100 (not drawn to scale) comprising end regions 104 and 106 separated by a central region 102. The central region 102 has defined edges and the end regions are contiguous with and abut the edges of the central region. A free layer (free ferromagnetic layer) 110 is separated from a pinned layer (pinned ferromagnetic layer) 120 by a non-magnetic, electrically-conducting spacer 115. The magnetization of the pinned layer 120 is fixed through exchange coupling with an antiferromagnetic (AFM) layer 125. An underlayer 126 is positioned below the AFM layer 125.

The underlayer 126, or seed layer, is any layer deposited to modify the crystallographic texture or grain size of the subsequent layers, and may not be needed depending on the substrate. A variety of oxide and/or metal materials have been employed to construct underlayer 126 for improving the properties of spin valve sensors. Often, the underlayer 126 may be formed of tantalum (Ta), zirconium (Zr), hafnium (Hf), or yttrium (Y). Ideally, such layer comprises NiFeCr in order to further improve operational characteristics.

Free layer 110, spacer 115, pinned layer 120, the AFM layer 125, and the underlayer 126 are all formed in the central region 102. Hard bias layers 130 and 135 formed in the end regions 104 and 106, respectively, provide longitudinal bias for the free layer 110. Leads 140 and 145 formed over hard bias layers 130 and 135, respectively, provide electrical connections for the flow of the sensing current $I_s$ from a current source 160 to the MR sensor 100. Sensor 170 is connected to leads 140 and 145 senses the change in the resistance due to changes induced in the free layer 110 by the external magnetic field (e.g., field generated by a data bit stored on a disk). IBM's U.S. Pat. No. 5,206,590 granted to Dieny et al. and incorporated herein by reference, discloses an MR sensor operating on the basis of the spin valve effect.

Figure 2A:
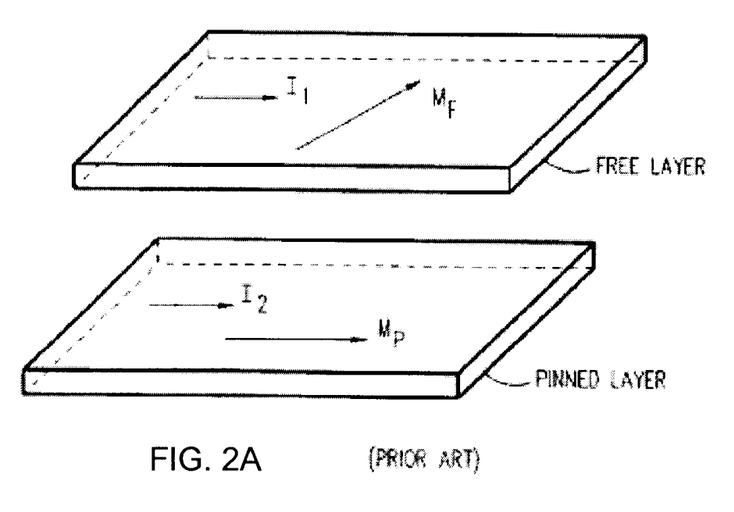
FIGS. 2A and 2B illustrate a perspective of the free and pinned layers, and a diagram of the magnetization vectors, respectively, of a prior art MR sensor.
Figure 2B:
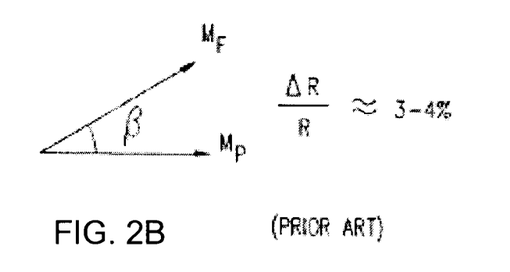

In use, the GMR effect depends on the angle between the magnetizations of the free and pinned layers. More specifically, the GMR effect is proportional to the cosine of the angle $\beta$ between the magnetization vector of the pinned layer ($M_P$) and the magnetization vector of the free layer ($M_F$) (Note FIGS. 2A and 2B). In a spin valve sensor, the electron scattering and therefore the resistance is maximum when the magnetizations of the pinned and free layers are antiparallel, i.e., majority of the electrons are scattered as they try to cross the boundary between the MR layers. On the other hand, electron scattering and therefore the resistance is minimum when the magnetizations of the pinned and free layers are parallel; i.e., majority of electrons are not scattered as they try to cross the boundary between the MR layers.

In other words, there is a net change in resistance of a spin valve sensor between parallel and antiparallel magnetization orientations of the pinned and free layers. The GMR effect, i.e., the net change in resistance, exhibited by a typical prior art spin valve sensor is about 6% to 8%.

Figure 2C:
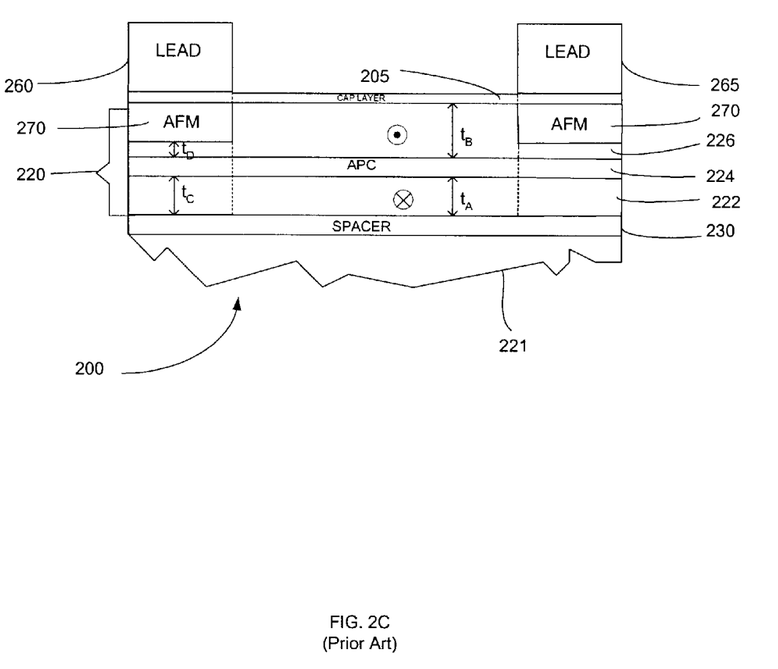
FIG. 2C illustrates an ABS view of an MR sensor according to another prior art embodiment, namely with an AP-coupled ferromagnetic layer structure (not drawn to scale).

FIG. 2C illustrates an air bearing surface (ABS) view of an MR sensor 200 according to another prior art embodiment, namely with an AP-coupled ferromagnetic layer structure (not drawn to scale). The MR sensor 200 comprises a ferromagnetic layer structure 220 and remaining unillustrated lower layers 221 (i.e. pinned layer, etc.) separated from each other by a non-magnetic, electrically conducting spacer layer 230. The unillustrated lower layers 221 have been excluded for clarity purposes.

The ferromagnetic layer structure 220 comprises a first ferromagnetic layer 222 and a second ferromagnetic layer 226 separated from each other by an antiparallel coupling (APC) layer 224 that allows the two ferromagnetic layers 222, 226 to be strongly coupled together antiferromagnetically. In use, the ferromagnetic layers are deposited in the presence of an orienting magnetic field to set the preferred magnetizations of the layers perpendicular to the ABS.

The two ferromagnetic layers 222, 226 have their magnetization directions oriented antiparallel, as indicated by arrows (see arrow heads pointing out of and in to the plane of the paper, respectively). The antiparallel alignment of the magnetizations of the two ferromagnetic layers 222, 226 is due to an antiferromagnetic exchange coupling through the APC layer 224, formed of a ruthenium (Ru) film or the like. Spacer layer 230 may be formed of a copper (Cu) film. Lead layers 260 and 265 are deposited on the end regions of a cap layer 205 to provide electrical connections for the flow of the sensing current Is from a current source to the MR sensor 200 for reasons similar to those set forth during reference to FIG. 1.

While the sensor valve of FIG. 1 relies on the longitudinal biasing of the hard bias layers to pin the associated free layer, the MR sensor 200 of FIG. 2 relies upon an antiferromagnetic (AFM) layer 270 for such longitudinal biasing. In use, inner portions of the ferromagnetic layer structure 220 are free, while outer portions of the ferromagnetic layer structure 220 are pinned by the AFM layer 270, in a manner that will soon be set forth.

Various parameters are pertinent to the operation of the MR sensor 200. In particular, such parameters include an inner thickness of the first ferromagnetic layer 222, $t_A$; an inner thickness of the second ferromagnetic layer 226, $t_B$; an outer thickness of the first ferromagnetic layer 222, $t_C$; and an outer thickness of the second ferromagnetic layer 226, $t_D$.

While the foregoing parameters, $t_A$, $t_B$, $t_C$, and $t_D$ are physical measurements, they may be used to calculate another less tangible value, namely the magnetic thickness of the free and pinned portions of the ferromagnetic layer structure 220. In particular, the magnetic thickness of the inner free portions of the first ferromagnetic layers 222 and the second ferromagnetic layer 226 is calculated by Equation #1.

Inner Free Portion Magnetic Thickness=$t_A$-$t_B$  Equation #1

Further, the magnetic thickness of the outer pinned portions of the first ferromagnetic layer 222 and the second ferromagnetic layer 226 is calculated by Equation #2.

Outer Pinned Portion Magnetic Thickness=$t_D$-$t_C$  Equation #2

It should be noted that the foregoing magnetic thicknesses play an instrumental role in stabilizing the ferromagnetic layer structure 220. To accomplish this stabilization, 1) the outer pinned portions of the first and second ferromagnetic layers 222 and 226 must be pinned and 2) the inner free portions of the ferromagnetic layer structure 220 must be provided with a longitudinal bias that maintains it in a single domain state or, in other words, maintain the field in the inner free portions in a single direction.

To promote strong pinning, it is necessary for the outer pinned portion magnetic thickness ($t_D$-$t_C$) to be small (i.e. about 10A). Further, to effect the desired longitudinal bias, the outer pinned portion magnetic thickness ($t_D$-$t_C$) must be greater than the inner free portion magnetic thickness ($t_A$-$t_B$) in order to work in conjunction with the AFM layer 270 to provide a biasing field.

Unfortunately, attempting to minimize the outer pinned portion magnetic thickness makes it difficult to ensure that the outer pinned portion magnetic thickness ($t_D$-$t_C$) is greater than the inner free portion magnetic thickness ($t_A$-$t_B$).

There is thus a need for a MR sensor system and associated method of manufacturing the same which are capable of accomplishing both of these requirements effectively to provide an optimally stabilized free layer.

DISCLOSURE OF THE INVENTION

A magnetoresistive read (MR) sensor system and a method for fabricating the same are provided. Included are a spacer layer, and a first ferromagnetic layer positioned above the spacer layer. Also included is an antiparallel layer positioned above the first ferromagnetic layer. A second ferromagnetic layer is positioned above the antiparallel layer. Such first and second ferromagnetic layers are antiferromagnetically coupled.

Next provided is a pair of antiferromagnetic layers positioned above the second ferromagnetic layer for defining inner free portions and outer pinned portions of the first ferromagnetic layer and the second ferromagnetic layer. The inner free portion of the first ferromagnetic layer has a first thickness $t_A$, the inner free portion of the second ferromagnetic layer has a second thickness $t_B$, the outer pinned portion of the first ferromagnetic layer has a third thickness $t_C$, and the outer pinned portion of the second ferromagnetic layer has a fourth thickness $t_D$.

The third thickness $t_C$ of the first ferromagnetic layer and the fourth thickness $t_D$ of the second ferromagnetic layer are substantially equal to the enhance the pinning of the outer pinned portions of the ferromagnetic layers. As mentioned earlier, an outer pinned portion magnetic thickness is defined as ($t_D$-$t_C$), and must be minimized to enhance the pinning of the outer pinned portions of the ferromagnetic layers.

To accommodate this design, a pair of third ferromagnetic layers with a fifth thickness $t_E$ are positioned above the antiferromagnetic layers. This way, the magnetic thicknesses of the outer portions of the first and second ferromagnetic layers may be substantially equal while still providing a longitudinal bias. As mentioned earlier, the outer pinned portion magnetic thickness must be greater than the inner free portion magnetic thickness ($t_A$-$t_B$) in order to work in conjunction with the AFM layer to provide adequate longitudinal bias. For purposes of providing the longitudinal bias, the outer pinned portion magnetic thickness is now defined as ($t_E$+$t_D$-$t_C$), which may easily be designed to be greater than the inner free portion magnetic thickness ($t_A$-$t_B$) by increasing fifth thickness $t_E$.

The associated method involves depositing a spacer layer and a first ferromagnetic layer positioned above the spacer layer. Also deposited is an antiparallel layer positioned above the first ferromagnetic layer. Next, a second ferromagnetic layer is positioned above the antiparallel layer such that the first ferromagnetic layer and the second ferromagnetic layer are antiferromagnetically coupled. Thereafter, a pair of antiferromagnetic layers is positioned above the second ferromagnetic layer for defining inner free portions and outer pinned portions of the first ferromagnetic layer and the second ferromagnetic layer. A pair of third ferromagnetic layers is then positioned above the antiferromagnetic layers.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 3:
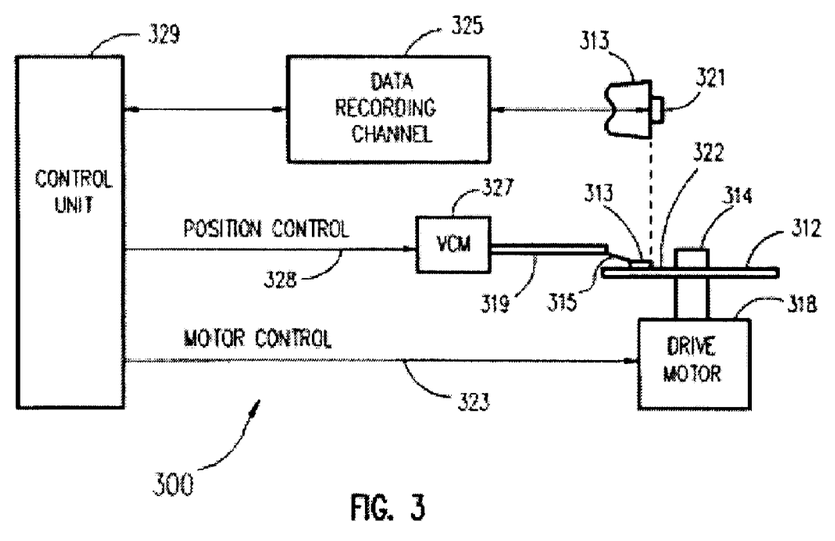
FIG. 3 is a perspective drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321 where the head 321 incorporates the MR sensor of the present invention. As the disks rotate, slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a magnetic disk storage system of the present invention, and the accompanying illustration of FIG. 3 are for representation purposes only. It should be apparent that disk storage systems may contain a large number of disks and actuators, and each actuator may support a number of sliders.

Figure 4:
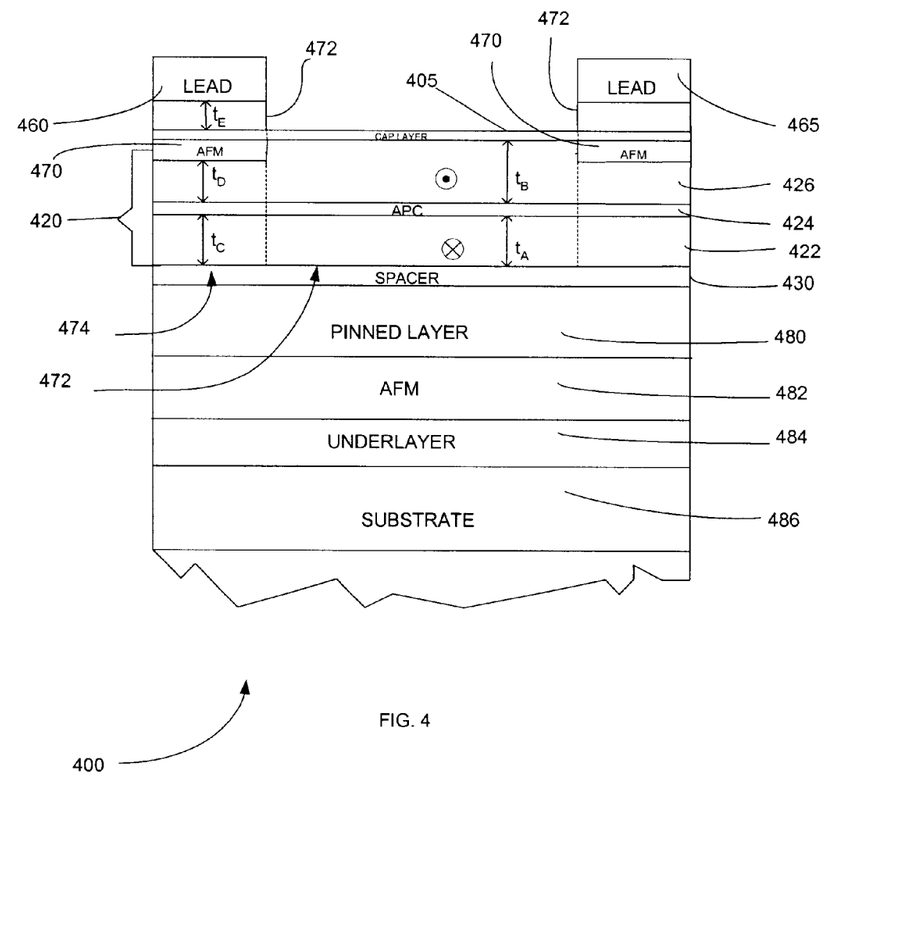
FIG. 4 shows an air bearing surface (ABS), not to scale, of an MR sensor with an exchange stabilized AP-coupled free layer, in accordance with one embodiment.

Now referring to FIG. 4, there is shown a magnetoresistive read (MR) sensor system 400, in accordance with one embodiment. While the present MR system 400 may be constructed in the context of the magnetic disk storage system of FIG. 3, it should be noted that the MR sensor system 400 may be implemented in any desired context.

The MR sensor system 400 comprises a ferromagnetic layer structure 420 and remaining lower layers (i.e. pinned layer, etc.) separated from each other by a non-magnetic, electrically conducting spacer layer 430. The lower layers may include any desired layers or a lack thereof. Just by way of example, the lower layers may include a pinned layer 480, antiferromagnetic (AFM) layer 482, underlayer 484, and substrate 486.

The ferromagnetic layer structure 420 may include a first ferromagnetic layer 422 and a second ferromagnetic layer 426 separated from each other by an antiparallel coupling (APC) layer 424 that allows the two ferromagnetic layers 422, 426 to be strongly coupled together antiferromagnetically.

The two ferromagnetic layers 422, 426 have their magnetization directions oriented antiparallel, as indicated by arrows (see arrow heads pointing out of and in to the plane of the paper, respectively). The antiparallel alignment of the magnetizations of the two ferromagnetic layers 422, 426 is due to an antiferromagnetic exchange coupling through the APC layer 424, formed of a ruthenium (Ru) film or the like. As an option, the APC layer 424 may have a thickness of 8 A. Spacer layer 430 may be formed of a copper (Cu) film. As an option, the spacer layer 430 may have a thickness of 20 A. Lead layers 460 and 465 are deposited on the end regions of a cap layer 405 to provide electrical connections for the flow of the sensing current Is from a current source to the MR sensor 400 for reasons similar to those set forth during reference to FIG. 1.

Also provided is a pair of antiferromagnetic layers 470 positioned above the second ferromagnetic layer 426 for defining inner free portions 472 and outer pinned portions 474 of the first ferromagnetic layer 422 and the second ferromagnetic layer 426. The inner free portion 472 of the first ferromagnetic layer 422 has a first thickness $t_A$, the inner free portion 472 of the second ferromagnetic layer 426 has a second thickness $t_B$, the outer pinned portion 474 of the first ferromagnetic layer 422 has a third thickness $t_C$, and the outer pinned portion 474 of the second ferromagnetic layer 426 has a fourth thickness $t_D$.

One exemplary list of materials that may be used for the layers starting at the spacer layer 430 will now be set forth. It should be noted that the stack of materials for the inner free portions 472 is different from that of the outer pinned portions 474. For example, the outer pinned portions 474 may include the following layers: Cu/CoFe/NOL/CoFe/Ru/CoFe/NiFe/AFM/Ta cap/lead. Moreover, the inner free portions 472 may include the following layers: Cu/CoFe/NOL/CoFe/Ru/CoFe/NiFe/Ta cap. As is now apparent, the first ferromagnetic layer 422 may include the following layers: CoFe/NOL/CoFe; and the second ferromagnetic layer 426 may include the following layers: CoFe/NiFe.

In use, the third thickness $t_C$ of the first ferromagnetic layer 422 and the fourth thickness $t_D$ of the second ferromagnetic layer 426 are substantially equal to the enhance the pinning of the outer pinned portions of the ferromagnetic layers. To facilitate this, a pair of third ferromagnetic layers 472 with a fifth thickness $t_E$ is positioned above the antiferromagnetic layers 470. This way, both a top surface and a bottom surface of the antiferromagnetic layers 470 are used to pin the outer pinned portions 474, and an appropriate longitudinal bias is provided.

To promote strong pinning, the outer portion magnetic thickness ($t_D-t_C$) may be substantially equal (i.e. small—less than or equal 10 A or any other magnetic thickness capable of delivering the desired pinning strength). With respect to the longitudinal bias, the outer portion magnetic thickness is calculated ($t_E+t_D-t_C$) and is greater than the inner portion magnetic thickness ($t_A-t_B$) in order to work in conjunction with the AFM layer 470 to provide an optimal biasing field.

Figure 5:
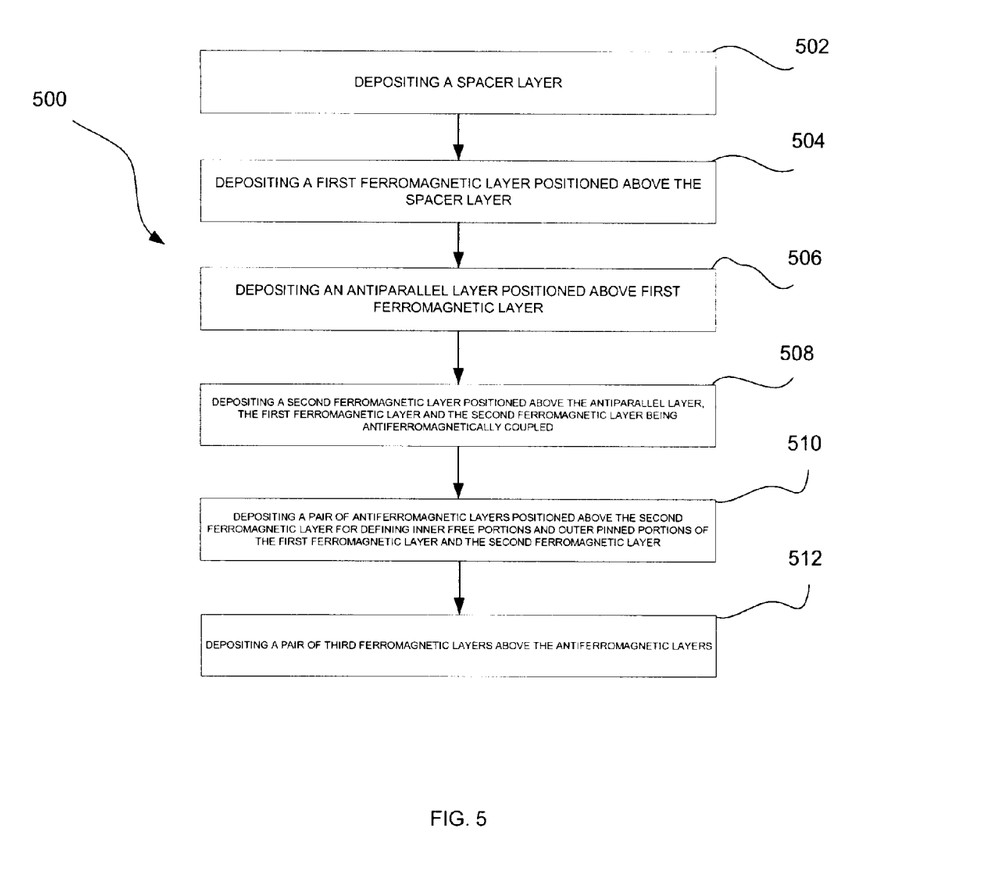
FIG. 5 illustrates a method for providing a MR sensor with an exchange stabilized AP-coupled free layer, in accordance with one embodiment.

FIG. 5 illustrates a method 500 for providing an MR sensor with an exchange stabilized AP-coupled free layer, in accordance with one embodiment. Initially, in operation 502, a spacer layer is deposited on any desired lower layers. Next, a first ferromagnetic layer is positioned above the spacer layer in operation 504. Also deposited is an antiparallel layer positioned above the first ferromagnetic layer. See operation 506. Next, in operation 508, a second ferromagnetic layer is positioned above the antiparallel layer such that the first ferromagnetic layer and the second ferromagnetic layer are antiferromagnetically coupled. Thereafter, in operation 510, a pair of antiferromagnetic layers is positioned above the second ferromagnetic layer for defining inner free portions and outer pinned portions of the first ferromagnetic layer and the second ferromagnetic layer. A pair of third ferromagnetic layers is subsequently positioned above the antiferromagnetic layers. See operation 512.

This way, the thicknesses of the outer portions of the first and second ferromagnetic layers may be substantially equal to optimally pin the outer portions, while still providing a longitudinal bias, since the outer combined thickness of the first, second and third ferromagnetic layers is greater than the inner combined thickness of the first and second ferromagnetic layers.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive read (MR) sensor comprising:
   a space layer;
   a first ferromagnetic layer positioned above the spacer layer;
   an antiparallel layer positioned above the first ferromagnetic layer;
   a second ferromagnetic layer positioned above the antiparallel layer, the first ferromagnetic layer and the second ferromagnetic layer being antiferromagnetically coupled; and
   a pair of antiferromagnetic layers positioned above the second ferromagnetic layer for defining inner free portions and outer pinned portions of the first ferromagnetic layer and the second ferromagnetic layer, the inner free portion of the first ferromagnetic layer having a first thickness $t_A$, the inner free portion of the second ferromagnetic layer having a second thickness $t_B$, the outer pinned portion of the second ferromagnetic layer having a fourth thickness $t_D$;
   wherein the third thickness $t_C$ of the first ferromagnetic layer and the fourth thickness $t_D$ of the second ferromagnetic layer are substantially equal to the enhance the pinning of the outer pinned portions of the ferromagnetic layers.

2. The MR sensor as recited in claim 1, and further comprising a pair of third ferromagnetic layers with a fifth thickness $t_E$ positioned above the antiferromagnetic layers.

3. The MR sensor as recited in claim 2, wherein ($t_E+t_D-t_C$) is greater than ($t_B-t_A$) for maintaining a longitudinal bias of the inner free portions of the first and second ferromagnetic layers.

4. The MR sensor as recited in claim 2, wherein both a top surface and a bottom surface of the antiferromagnetic layers are used to pin the outer pinned portions.

5. The MR sensor as recited in claim 1, wherein the antiparallel layer includes Ru.

6. The MR sensor as recited in claim 1, wherein the spacer layer includes Cu.

7. The MR sensor as recited in claim 2, and further comprising a pair of leads positioned above the third ferromagnetic layers.

8. A method of fabricating a magnetoresistive read (MR) sensor comprising:
   depositing a spacer layer;
   depositing a first ferromagnetic layer positioned above the spacer layer;
   depositing an antiparallel layer positioned above the first ferromagnetic layer;
   depositing a second ferromagnetic layer positioned above the antiparallel layer, the first ferromagnetic layer and the second ferromagnetic layer being antiferromagnetically coupled; and
   depositing a pair of antiferromagnetic layers positioned above the second ferromagnetic layer for defining inner free portions and outer pinned portions of the first ferromagnetic layer and the second ferromagnetic layer, the inner free portion of the first ferromagnetic layer having a first thickness $t_A$, the inner free portion of the second ferromagnetic layer having a second thickness $t_B$, the outer pinned portion of the first ferromagnetic layer having a third thickness $t_C$, the outer pinned portion of the second ferromagnetic layer having a fourth thickness $t_D$;
   wherein the third thickness $t_C$ of the first ferromagnetic layer and the fourth thickness $t_D$ of the second ferromagnetic layer are substantially equal to the enhance the pinning of the outer pinned portions of the ferromagnetic layers.

9. The method as recited in claim 8, and further comprising depositing a pair of third ferromagnetic layers with a fifth thickness $t_E$ above the antiferromagnetic layers.

10. The method as recited in claim 9, wherein ($t_E+t_D-t_C$) is greater than ($t_B-t_A$) for maintaining a longitudinal bias of the inner free portions of the first and second ferromagnetic layers.

11. The method as recited in claim 9, wherein both a top surface and a bottom surface of the antiferromagnetic layers are used to pin the outer pinned portions.

12. The method as recited in claim 8, wherein the antiparallel layer includes Ru.

13. The method as recited in claim 8, wherein the spacer layer includes Cu.

14. The method as recited in claim 9, and further comprising depositing a pair of leads above the third ferromagnetic layers.

15. A magnetoresistive read (MR) sensor comprising:
a spacer layer;
a first ferromagnetic layer positioned above the spacer layer;
an antiparallel layer positioned above the first ferromagnetic layer;
a second ferromagnetic layer positioned above the antiparallel layer, the first ferromagnetic layer and the second ferromagnetic layer being antiferromagnetically coupled;
a pair of antiferromagnetic layers positioned above the second ferromagnetic layer for defining inner free portions and outer pinned portions of the first ferromagnetic layer and the second ferromagnetic layer; and
a pair of third ferromagnetic layers positioned above the antiferromagnetic layers;
wherein both a top surface and a bottom surface of the antiferromagnetic layers are used to pin the outer pinned portions.

16. A method of fabricating a magnetoresistive read (MR) sensor comprising:
depositing a spacer layer;
depositing a first ferromagnetic layer positioned above the spacer layer;
depositing an antiparallel layer positioned above the first ferromagnetic layer;
depositing a second ferromagnetic layer positioned above the antiparallel layer, the first ferromagnetic layer and the second ferromagnetic layer being antiferromagnetically coupled;
depositing a pair of antiferromagnetic layers positioned above the second ferromagnetic layer for defining inner free portions and outer pinned portions of the first ferromagnetic layer and the second ferromagnetic layer; and
depositing a pair of third ferromagnetic layers above the antiferromagnetic layers;
wherein both a top surface and a bottom surface of the antiferromagnetic layers are used to pin the outer pinned portions.

17. A disk drive system, comprising:
a magnetic recording disk;
a magnetoresistive read (MR) sensor including:
 a spacer layer,
 a first ferromagnetic layer positioned above the spacer layer,
 an antiparallel layer positioned above the first ferromagnetic layer,
 a second ferromagnetic layer positioned above the antiparallel layer, the first ferromagnetic layer and the second ferromagnetic layer being antiferromagnetically coupled, and
 a pair of antiferromagnetic layers positioned above the second ferromagnetic layer for defining inner free portions and outer pinned portions of the first ferromagnetic layer and the second ferromagnetic layer, the inner free portion of the first ferromagnetic layer having a first thickness $t_A$, the inner free portion of the second ferromagnetic layer having a second thickness $t_B$, the outer pinned portion of the first ferromagnetic layer having a third thickness $t_C$, the outer pinned portion of the second ferromagnetic layer having a fourth thickness $t_D$,
 wherein the third thickness $t_C$ of the first ferromagnetic layer and the fourth thickness $t_D$ of the second ferromagnetic layer are substantially equal to the enhance the pinning of the outer pinned portions of the ferromagnetic layers;
an actuator for moving the MR sensor across the magnetic recording disk so the MR sensor may access different regions of magnetically recorded data on the magnetic recording disk; and
a controller electrically coupled to the MR sensor for detecting changes in resistance of the MR sensor.

18. A disk drive system, comprising:
a magnetic recording disk;
a magnetoresistive read (MR) sensor including:
 a spacer layer,
 a first ferromagnetic layer positioned above the spacer layer,
 an antiparallel layer positioned above the first ferromagnetic layer,
 a second ferromagnetic layer positioned above the antiparallel layer, the first ferromagnetic layer and the second ferromagnetic layer being antiferromagnetically coupled,
 a pair of antiferromagnetic layers positioned above the second ferromagnetic layer for defining inner free portions and outer pinned portions of the first ferromagnetic layer and the second ferromagnetic layer, and
 a pair of third ferromagnetic layers positioned above the antiferromagnetic layers,
 wherein both a top surface and a bottom surface of the antiferromagnetic layers are used to pin the outer pinned portions;
an actuator for moving the MR sensor across the magnetic recording disk so the MR sensor may access different regions of magnetically recorded data on the magnetic recording disk; and
a controller electrically coupled to the MR sensor for detecting changes in resistance of the MR sensor.

* * * * *

UNITED STATES PATENT AND TRADEMARK OFFICE
CERTIFICATE OF CORRECTION

PATENT NO. : 6,697,236 B2
DATED : February 24, 2004
INVENTOR(S) : Gill

It is certified that error appears in the above-identified patent and that said Letters Patent is hereby corrected as shown below:

Column 9,
Lines 37 and 40, after "antiparallel" insert -- coupling --;

Column 10,
Lines 1, 4, 36 and 39, after "antiparallel" insert -- coupling --.

Signed and Sealed this

Twenty-fourth Day of August, 2004

JON W. DUDAS
*Director of the United States Patent and Trademark Office*